United States Patent [19]

Romach et al.

[11] Patent Number: 5,714,308
[45] Date of Patent: Feb. 3, 1998

[54] ATMOSPHERIC PRESSURE GLOW DISCHARGE TREATMENT OF POLYMERIC SUPPORTS TO PROMOTE ADHESION FOR PHOTOGRAPHIC APPLICATIONS

[75] Inventors: Mark M. Romach, Rochester; David Appler Glocker, West Henrietta, both of N.Y.

[73] Assignee: Eastman Kodak Company, Rochester, N.Y.

[21] Appl. No.: 600,568

[22] Filed: Feb. 13, 1996

[51] Int. Cl.$^6$ ................................................ G03C 1/76
[52] U.S. Cl. .................. 430/523; 430/524; 430/527; 430/530; 430/531; 430/532; 430/631; 430/935; 430/950; 430/961; 422/186.05; 422/907
[58] Field of Search ........................ 430/523, 527, 430/524, 631, 935, 950, 961, 531, 530, 532; 422/186.05, 907

[56] References Cited

U.S. PATENT DOCUMENTS

| | | | |
|---|---|---|---|
| 3,411,908 | 11/1968 | Crawford et al. | 96/74 |
| 3,531,314 | 9/1970 | Kerr et al. | 117/34 |
| 3,582,339 | 6/1971 | Martens et al. | 96/87 |
| 3,607,345 | 9/1971 | Thomas et al. | 117/34 |
| 3,630,742 | 12/1971 | Crawford et al. | 96/87 |
| 3,837,886 | 9/1974 | Tatsuta et al. | 117/34 |
| 3,860,427 | 1/1975 | Matsuo et al. | 96/87 |
| 3,874,877 | 4/1975 | Omichi et al. | 96/87 |
| 3,888,753 | 6/1975 | Kiikka et al. | 204/168 |
| 4,055,685 | 10/1977 | Bayer et al. | 96/87 |
| 4,087,574 | 5/1978 | Yamaguchi et al. | 427/407 |
| 4,229,523 | 10/1980 | Ohta et al. | 430/532 |
| 4,241,169 | 12/1980 | Work, III et al. | 430/532 |
| 4,363,872 | 12/1982 | Ealding | 430/532 |
| 4,394,442 | 7/1983 | Miller | 430/532 |
| 4,429,032 | 1/1984 | Matthe et al. | 430/231 |
| 4,451,497 | 5/1984 | Dolezalek et al. | 427/39 |
| 4,518,681 | 5/1985 | Johnson et al. | 430/532 |
| 4,701,403 | 10/1987 | Miller | 430/529 |

(List continued on next page.)

FOREIGN PATENT DOCUMENTS

| 04168281 | 6/1992 | Japan . |
|---|---|---|
| 94/28568 | 12/1994 | WIPO . |

OTHER PUBLICATIONS

S. Kanazawa, M. Kogoma, T. Moriwaki and S. Okazaki, "*Stable Glow Plasma At Atmospheric Pressure*", J. Phys. D: Appl. Phys 21 (1988) 838–840.

T. Yokoyama, M. Kogoma, S. Kanazawa, T. Moriwaki and S. Okazaki, "*Glow Plasma Treatment at Atmospheric Pressure For Surface Modification and Film Deposition*", J. Phys. 23 (1990).

S. Kanazawa, M. Kogoma, S. Okazaki and T. Moriwaki, "*the Improvement of the Atmospheric–Pressure Glow Plasma Method and the Deposition of Organic Films*", Nuclear Instruments and Methods in Physics Research B37/38, (1989), 842–845.

T. Yokoyama, M. Kogoma, T. Moriwaki and S. Okazaki, "*The Mechanism of the Stabilization of Glow Plasma at Atmospheric Pressure*", J. D: Appl. Phys, 23 (1990) 1125–1128.

A. Nagata S. Takehiro, H. Sumi, M. Kogoma, Okazaki and Y. Horilike, "*Downstream Etching and Depostion Employing Atmospheric Pressure Discharge*", Proc. Jpn Symp. Plasma Chem 2 (1989) 109–112.

*Primary Examiner*—Geraldine Letscher
*Attorney, Agent, or Firm*—Arthur H. Rosenstein

[57] ABSTRACT

The present invention is a method for treating a polyester support such as polyethylene naphthalate or polyethylene terephthalate. The treatment is carried out at near atmospheric pressure in a gas of helium and optionally nitrogen and/or oxygen. The treatment uses anodized aluminum electrodes and an atmospheric glow discharge results when the electrodes are connected to an RF generator and spaced about 2 mm apart. The process and apparatus improve adhesion of subsequently coated emulsions on the polyester support at high speeds and relatively low power by selecting a frequency of 40 kHz to 500 kHz.

18 Claims, 1 Drawing Sheet

U.S. PATENT DOCUMENTS

| | | | |
|---|---|---|---|
| 4,993,267 | 2/1991 | Allard et al. | 73/726 |
| 5,004,669 | 4/1991 | Yamada et al. | 430/264 |
| 5,244,780 | 9/1993 | Strobel et al. | 430/535 |
| 5,295,039 | 3/1994 | Nakjima et al. | 430/532 |
| 5,425,980 | 6/1995 | Grace et al. | 428/195 |
| 5,558,843 | 9/1996 | Glocker et al. | 422/186.05 |
| 5,582,921 | 12/1996 | Grace et al. | 430/532 |

ATMOSPHERIC PRESSURE GLOW DISCHARGE TREATMENT OF POLYMERIC SUPPORTS TO PROMOTE ADHESION FOR PHOTOGRAPHIC APPLICATIONS

FIELD OF THE INVENTION

This invention describes an improved process for treating photographic support with electrical discharges at atmospheric pressure to promote the adhesion of subsequent coated layers.

BACKGROUND OF THE INVENTION

Corona discharges are used widely in industry to promote adhesion between various materials. In manufacturing photographic products there is a large body of literature describing various applications of coronas to make aqueous and non-aqueous coatings adhere to substrate materials. Almost all of these coronas are produced by applying a high voltage (approximately 5–10 kV), relatively high frequency (10 kHz) signal to electrodes in air at atmospheric pressure. See, for example, U.S. Pat. No. 4,241,169; U.S. Pat. No. 4,701,403; U.S. Pat. No. 4,087,574; U.S. Pat. No. 4,429,032; U.S. Pat. No. 4,363,872; U.S. Pat. No. 4,229,523; U.S. Pat. No. 4,394,442; U.S. Pat. No. 3,411,908; U.S. Pat. No. 3,531,314; U.S. Pat. No. 3,582,339; U.S. Pat. No. 3,607,345; U.S. Pat. No. 3,630,742; U.S. Pat. No. 3,860,427; U.S. Pat. No. 3,874,877; U.S. Pat. No. 3,888,753; U.S. Pat. No. 4,055,685; U.S. Pat. No. 4,518,681; U.S. Pat. No. 5,004,669; FR 76 13034; EP Application No. 92303556.2. There are limitations to the usefulness of corona treatments, however. Coronas produce locally energetic discharges, known commonly as streamers, and these streamers may cause a non-uniform level of treatment. They may also be related to an inhomogeneous loss of red speed in photographic emulsions which produces a mottle defect. Furthermore, coronas appear to be effective at promoting adhesion of coatings to polyethylene, but are relatively ineffective at promoting the adhesion of layers to various polyester supports such as polyethylene terephthalate (PET), polyethylene naphthalate (PEN), etc.

A more controllable and effective way of preparing polymers for coating is with low pressure glow discharge treatments. Glow discharges are, by nature, very diffuse and homogeneous, producing a more uniform treatment. Moreover, by controlling the gas it is possible to improve the adhesion of photographic layers to materials such as polyesters as well as polyethylene. See, for example, U.S. Pat. No. 4,993,267; U.S. Pat. No. 3,837,886; U.S. Pat. No. 4,451,497. A major disadvantage in glow discharge treatments done at reduced pressures is the problem of maintaining a low pressure at the treatment station. It is necessary to use either a batch process, in which the support is loaded into a chamber and the air is removed, or an in-line process, which requires that the support pass through a differential pressure region. In the first case, the support must go through an additional off-line step before the coatings are applied. This is unattractive from a product-flow perspective and requires additional capital. The second choice is difficult and expensive to implement because of the very tight tolerances needed to maintain the pressure differentials in the transport path. This requires expensive and complicated hardware and pumps. The closer to atmospheric pressure that these treatments can be done, the simpler and less costly the process becomes.

It is known that under the right conditions, stable diffuse glow discharges can be produced at atmospheric pressures. Articles that discuss stable atmospheric glow discharges are: S. Kanazawa, M. Kogoma, T. Moriwaki, and S. Okazaki, J. Phys. D: Appl. Phys 21 (1988) 838–840; S. Kanazawa, M. Kogoma, S. Okazaki, and T. Moriwaki, Nuclear Instruments and Methods in Physics Research B37/38 (1989) 842–845; T. Yokoyama, M. Kogoma, S. Kanazawa, T. Moriwaki, and S. Okazaki, J. Phys. D: Appl. Phys. 23 (1990) 374–377; T. Yokoyama, M. Kogoma, T. Moriwaki, and S. Okazaki, J. Phys. D: Appl. Phys. 23 (1990) 1125–1128; and A. Nagata, S. Takehiro, H. Sumi, M. Kogoma, S. Okazaki, and Y. Horiike, Proc. Jpn. Symp. Plasma Chem 2 (1989) 109–112. This area has been limited and directed primarily at etching of photoresist and deposition of materials. However, there are references to treatments for adhesion (WO 94/28568). Many reports indicate that a reliable method of producing diffuse glow discharges at atmospheric pressures is to use helium as the discharge gas. The work reported in the literature has been reproduced and found to be reliable. It has also been found that very small amounts of reactive gases, such as a few percent nitrogen or oxygen, will extinguish an atmospheric helium discharge. However, we have found that by using trace amounts of active gases in a novel discharge device, at certain frequencies stable atmospheric pressure discharges can be produced which can dramatically improve the adhesion of photographic emulsions to difficult to coat materials such as polyethylene, PET, and PEN.

In U.S. Ser. No. 08/299,776 filed Sep. 1, 1994, we describe a method of treating a polymeric support comprising a first electrode having a first surface, the first electrode having a plurality of spaced apart holes adjoining the first surface, positioning a second electrode having a second surface spaced apart from the first surface of the first electrode, pumping gas through the holes wherein the gas is greater than or equal to atmospheric pressure, the gas comprising helium and optionally oxygen and/or nitrogen, coupling a power supply to the first electrode having a frequency of 10 kHz to 50 mHz, and positioning a web between the first surface of the first electrode and the second surface of the second electrode wherein the polymeric web is subjected to atmospheric glow discharge to improve the adhesive properties.

The above method has been found to be very useful, but it is quite important, in photographic systems, to be able to run film through at extremely fast rates such as 5 ft. per minute or higher and at comparatively low power densities, such as 5 watts per square centimeter or less. For treatment purposes, the power density is defined as the total power delivered to the treatment electrode divided by the area of the treatment zone.

The present invention allows one to treat polymeric surfaces with a stable atmospheric glow discharge so that adhesion of photographic emulsions is improved while operating at high speeds and relatively low power requirements.

SUMMARY OF THE INVENTION

The present invention is a method of treating a polymeric support. The method includes providing a first electrode having a first surface, the first electrode having a plurality of spaced apart holes adjoining the first surface, the first surface being insulated. A second electrode having a second surface is positioned in a spaced apart relationship from the first surface of the first electrode. Gas is pumped through the plurality of holes at a pressure greater than or equal to atmospheric pressure. The gas comprises helium and optionally oxygen and/or nitrogen. A power supply is coupled to the first electrode, the power supply has a frequency of between 40 kHz to about 500 kHz. A web is positioned between the first surface of the first electrode and the second surface of the second electrode wherein the polymeric web is subjected to atmospheric glow discharge to improve the adhesive properties. The ratio of the speed of the web in feet per minute to the power density provided at the treatment station in W/cm$^2$ is 1:1 or higher.

The present invention provides the advantage of improving the adhesive properties of a polyester substrate using a glow discharge device that operates at atmospheric pressures while maintaining a high speed of support treatment at relatively low power density.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

Figure 1:
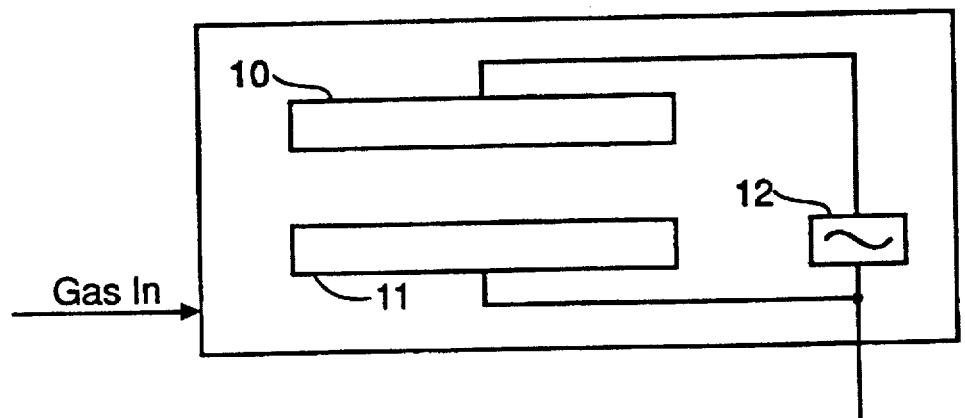
FIG. 1 shows a schematic of a prior art device used to obtain an atmospheric glow discharge.

FIG. 1 illustrates a prior art set-up used to obtain a near atmospheric pressure glow discharge. Two solid square aluminum electrodes 10 and 11, one of which was anodized (electrode 10), were used to treat fully oriented PET and oriented annealed PEN in helium and in mixtures of helium and oxygen and/or nitrogen. The electrodes 10 and 11 were 7.5 by 7.5 cm and were 2 mm apart. They were powered by an RF generator 12 operating at 13.56 mHz. With a mixture of 1% to 4% $N_2$ in He by volume, a stable discharge was possible at a pressure of 800 Torr or below. Greater concentrations of reactive gas (either $N_2$ or $O_2$) further lowered the available operating pressures for stable discharges.

The gas used in the treatment of this invention is either helium alone, a mixture of helium and nitrogen, a mixture of helium and oxygen or a mixture of helium, nitrogen and oxygen. If a mixture is used, it is preferred to use helium with 0.1 to 8% nitrogen, helium with 0.1 to 8% oxygen or helium with 0.1 to 8% oxygen and 0.1 to 8% of nitrogen. These amounts are preferred as they give particularly strong adhesion at ratios of speed to power density (measured in ft/min per W/cm$^2$) of 1:1 and greater and in the critical frequency range of 40 kHz to 500 kHz.

Figure 2:
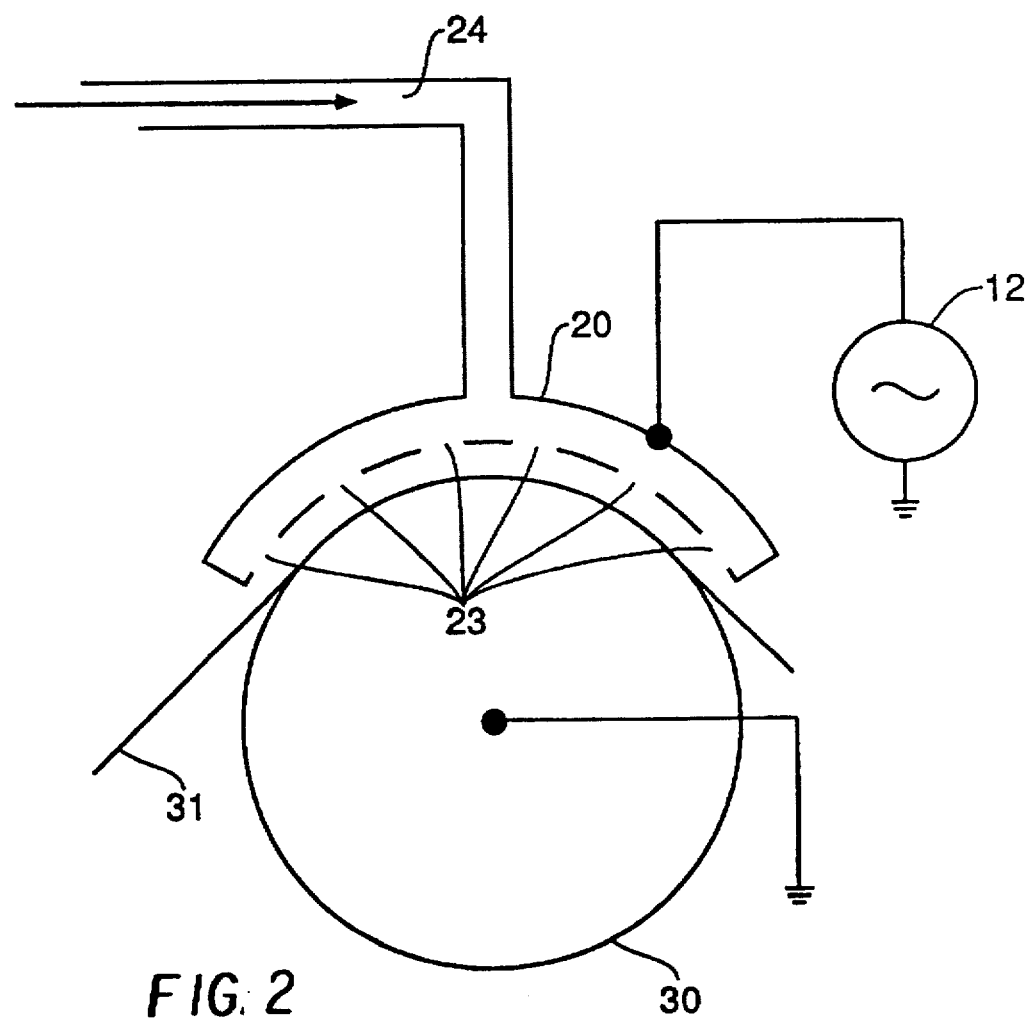
FIG. 2 shows an electrode configuration of the present invention for the continuous treatment of a moving web.

FIG. 2 shows a sectional view of the atmospheric glow discharge apparatus used in the present invention. Electrode 20 includes a series of apertures 23 through which the gas is supplied through inlet 24. The dimensions of electrode 20 are 12.1 cm by 13.3 cm. Electrode 20 has 333 apertures 23 each having a 1 mm diameter. The apertures are symmetrically distributed on the electrode 20. Surprisingly, it has been found that a stable glow discharge at atmospheric pressure with higher percentages of reactive gas species, most notable $N_2$ and $O_2$, is possible using the electrode 20 shown in FIG. 2. This allows for a faster and more complete treatment of the polyester substrate at low power. The perforated electrode configuration shown in FIG. 2 can be operated in ambient air with a mixture of 8% $N_2$ in He being supplied through the apertures 23. Using the solid electrodes of FIG. 1 a stable discharge was not possible using the same gas mixture.

It is essential in the treatment of polymeric supports to enhance the adhesivity using a transport speed as high as possible with a power as low as possible. As all photographic processes are carried out at extremely high speed to maintain adequate cost consideration and ample supply, it is critical to be able to attain the desired adhesivity at higher web speed. This is extremely difficult as seen by the following table where mixtures of gas as described in U.S. Ser. No. 08/299,776 were used at various speeds of from 1 to 30 ft. per minute. As the speed of the web increases many of the gas mixtures could not retain the adhesive properties.

It is also critical to use the lowest power possible because large power requirements increase the capital costs and can thermally damage the web being treated. The power density is defined as the power delivered to the treatment electrode divided by the area of the treatment electrode and is measured in watts per square centimeter.

It has been found herein that effective treatments at ratios of web speed in ft./min. to power density in W/cm$^2$ of 1:1 or higher can be attained only at frequencies of from 40 kHz to 500 kHz.

In order to demonstrate the improved adhesion properties of PET and PEN available from the method of the present invention comparative adhesion tests were run at different speeds, powers and frequencies using the perforated electrode of the present invention.

After treatment, the substrates (PEN and PET) were coated with a color film emulsion. In addition to photographic emulsions other layers can be adhered to the substrate, such as antistatic, magnetic and lubricant layers. Problems associated with electrostatic charge in the manufacture and utilization of imaging elements are well known. The accumulation of charge can result in dirt or dust attraction, producing physical detects. The discharge of accumulated charge during application or use of radiation sensitive layers (for example, photographic emulsions) can produce irregular fog patterns or static marks in the light sensitive layers(s). These static charge problems have become increasingly more severe due to increased photographic emulsion sensitivity, increased coating machine speeds, and increased post-coating drying efficiency. Transport charging results from the tendency of high dielectric materials to accumulate electrical charge when in relative motion to other materials. This results in static charging during coating and post-coating operations such as slitting and spooling. Static charge build-up may also occur during use of imaging elements system, for example during winding of a roll of photographic film out of and back into a film cassette in an automatic camera. Static discharge during magnetic reading and writing can result in increased bit error rates. These problems can be exacerbated at low relative humidities. Similarly, high speed processing of imaging elements can result in static charge generation. Due to the increasing demands for static charge control, a wide variety of ionically-conducting and electronically-conducting materials have been incorporated into antistatic layers for photographic imaging, magnetic recording and other imaging elements.

As an example of auxiliary layers, that can be adhered to the polyester substrate, it is well known from various U.S. Pat. Nos., including 3,782,947; 4,279,945; 4,990,276; 5,217, 804; 5,147,768; 5,229,259; 5,255,031; and others that a radiation-sensitive silver halide photographic element may contain a transparent magnetic recording layer which can advantageously be employed to record information into and read information from the magnetic recording layer by techniques similar to those employed in the conventional magnetic recording art. The use of a magnetic recording layer for information exchange allows improved photographic print quality through input and output of information identifying the light-sensitive material photographic conditions, printing conditions and other information.

Additional auxiliary layers may also be present in the imaging element. These layers may be used for but not limited to abrasion resistant and other protective layers, abrasive-containing layers, adhesion promoting layers, curl control layers, transport control layers, lubricant layers, magnetic layers, and other layers for purposes such as improved web conveyance, optical properties, physical performance and durability. After the emulsion was set and dried a series of adhesion tape tests were run to test the adhesive properties of the treated PET and PEN.

An apparatus like that shown in FIG. 2 was operated at three frequencies with several gases and gas mixtures. Polyethylene naphthalate was transported through the treatment zone at several speeds to assess the capability of the process to work in-line with other manufacturing operations, such as the coating of photographic emulsions. The surfaces thus treated were then coated by hand with an anti-halation layer, which is the first layer in many color photographic systems. In each case, the adhesion of the anti-halation layer was assessed in both the wet and dry states. Prior to testing, the coated films were dried for either 72 hours (dry testing) or 336 hours (wet testing) at 22C. and 40% relative humidity.

The dry test was done by attempting to peel the emulsion from the support with adhesive tape in five increasingly aggressive steps. The sequence consists of changing the tape type, tape width, type of scoring tool, type of scoring, and tape peeling speed. Either a high speed steel (HSS) tool bit or a dissection scalpel is used to form the pattern in the emulsion surface. A piece of the specific tape is then hand applied and pressed onto the prepared area. The length of the leader, or pull tab, is test specific to further control the peel speed.

The tapes used include 810 (½ inch width), manufactured by 3M® company, 610 (1 inch width), and 396 (¾ inch width). One of the tool bits may be used to slice the emulsion at the edge of the tape to concentrate the peel stresses to the area under the tape. Or, the peel forces can be spread out by not scribing the edges. In each case, the tape is then peeled such that the peel angle is 90 degrees between the tape and substrate. The speed of the peeling motion is another factor which affects the aggressiveness of the particular test. Two of the tests utilize multiple peels to increase the aggressiveness. A summary of the tests, in order of increasing aggressiveness is shown in Table 1.

TABLE 1

| Tape Test | Tool | Pattern | Tape | Leader | Edge Slice | Speed | # of Peels |
|---|---|---|---|---|---|---|---|
| D | Scalpel | None | 810 | 0.25" | No | Slow | 1 |
| E | Scalpel | None | 810 | 0.25" | Yes | Fast | 1 |
| F | HHS Bit | H | 810 | 4" | Yes | Fast | 3 |
| G | Scalpel | # | 610 | 4" | Yes | Fast | 3 |
| H | Scalpel | # | 396 | 2" | Yes | Fast | 1 |

The amount of the emulsion removed by the tape is recorded for each condition as a percentage of the original bounded area under the tape. A score of 0% removal means that no emulsion was removed under any condition, and is considered necessary for product-quality photographic film. A score of 100% means that there was complete removal under all 5 conditions. A score between 0 and 100% is determined by averaging the removal for all 5 conditions.

The wet adhesion is assessed by placing the coated film in developer solution at a temperature of 38C. and rubbing it with an abrasive pad (Scotchbrite) while a pressure of $1.0N/cm^2$ is applied to the pad. After 60 back and forth cycles under the pad, the amount of emulsion removed is assessed as a percentage of the abraded area. A score of zero removal is considered necessary for product-quality photographic film.

Table 2 below summarizes the adhesion results for a variety of treatment conditions, which use pure helium and mixtures of helium with nitrogen, oxygen, and carbon dioxide. For comparison, the results of coatings directly on untreated support are shown. On support with no treatment, there is 100% removal in both the wet and dry tests, showing that the adhesion of photographic emulsions to untreated PEN is unacceptable.

TABLE 2

| | Gas | Power (W) | Speed (FPM) | Speed/PowerDensity ($ft./min \over W/cm^2$) | Frequency | Emul2, Dry | Emul2, Wet |
|---|---|---|---|---|---|---|---|
| 1 | He | 700 | 1 | .23 | 13.56M | 32 | 100 |
| 2 | He | 300 | 1 | .54 | 13.56M | 17 | 100 |
| 3 | 2.0% N | 300 | 1 | .54 | 13.56M | 3 | 81 |
| 4 | He | 600 | 1 | .27 | 450K | 0 | 0.7 |
| 5 | He | 600 | 1 | .27 | 450K | 12 | 33 |
| 6 | He | 600 | 10 | 2.68 | 450K | 64 | 100 |
| 7 | He | 1,600 | 10 | 1.00 | 450K | 0 | 0.1 |
| 8 | 0.5% O | 660 | 1 | .24 | 450K | 0 | 0 |
| 9 | 0.5% O | 660 | 10 | 2.44 | 450K | 0 | 3.4 |
| 10 | 0.5% O | 690 | 20 | 4.66 | 450K | 0 | 100 |
| 11 | 2.0% N | 605 | 1 | .26 | 450K | 36 | 100 |
| 12 | 2.0% N | 605 | 10 | 2.66 | 450K | 0 | 0 |
| 13 | 2.0% N | 870 | 20 | 3.70 | 450K | 0 | 0 |
| 14 | 2.0% N | 1,950 | 30 | 2.47 | 450K | 0 | 0.1 |
| 15 | 1.2% $CO_2$ | 500 | 1 | .32 | 450K | 0 | 0 |
| 16 | He | 700 | 1 | .23 | 40K | 13 | 36 |
| 17 | 3.0% O | 300 | 1 | .53 | 40K | 0 | 66 |
| 18 | 3.6% N | 300 | 1 | .53 | 40K | 0 | 0 |
| 19 | 3.6% N | 300 | 5 | 2.68 | 40K | 0 | 0 |
| 20 | 3.6% N | 700 | 5 | 1.15 | 40K | 0 | 0 |

TABLE 2-continued

| Gas | Power (W) | Speed (FPM) | Speed/PowerDensity (ft/min / W/cm²) | Frequency | Emul2, Dry | Emul2, Wet |
|---|---|---|---|---|---|---|
| 21 AIR | 300 | 1 | .53 | 10K-CDT | 0 | 3.6 |
| 22 AIR | 300 | 10 | 5.36 | 10K-CDT | 4 | 100 |
| No Treatment | | | | | 100 | 100 |

Several important results are evident from the data in Table 2. First, the data reveal a surprising dependence of the adhesion results on the treatment frequency. It is most easily seen by looking at runs 1,4, and 16. All of these were done at the same speed, and comparable powers with pure helium gas. Run 1, done at a frequency of 13.5 mHz, has totally unacceptable adhesion; run 4, done at 450 kHz has good adhesion; run 16, done at 40 kHz, has poor adhesion.

The criteria for viable products are that the speed/power density ratio must be equal to or greater than 1 and the dry and wet adhesion removal scores must be less than 1 percent. Table 2 shows that the criteria are only met within frequencies between 40 and 450 kHz. It is seen that by raising the power, excellent adhesion can be obtained using helium with nitrogen at 450 kHz operating at speeds up to 30 feet per minute. The poor performance of helium/nitrogen mixtures at 1 foot per minute under these conditions could easily be due to too much treatment, which is known to lead to a very damaged surface.

In order to demonstrate the results, the electrode used in these experiments was connected to a standard corona discharge treatment power supply (10 kHz) and operated in ambient conditions, as is normally done with CDT. It is seen from runs 21 and 22 that at 1 foot per minute the results are completely unacceptable, for wet adhesion and at 10 feet per minute unacceptable for both wet and dry adhesion.

Roth et al (WO 94/28568) present an analysis of an atmospheric glow discharge device in which they calculate a lower limit for the frequency at which a discharge can be sustained. According to them, this frequency is given by $$f = \frac{eV}{\pi m \delta d^2}$$

where e is the ionic charge, V is the root-mean-square discharge voltage, m is the ionic mass, δ is the ionic collision frequency (given by Roth et al as $6.8 \times 10^9$ per second) and d is the plate separation for the discharge. At 40 kHz, the helium discharges operate at a plate separation of 1.5 mm with an rms voltage of 1100 V. According to Roth's teachings, the minimum frequency at which a discharge can be sustained under these conditions is 550 kHz. Some of the effective treatments herein, however, operate at 40 kHz, which is ten times lower than the lower limit that Roth teaches.

These results demonstrate that treatments of polymer support in helium or mixtures of helium with other reactive gases, done at the right frequencies, can significantly improve the adhesion of emulsion directly to the support. These types of results are not possible with conventional corona treatments in air.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

We claim:

1. A method of treating a polymeric support comprising:
   providing a first electrode having a first surface, the first electrode having a plurality of spaced apart holes adjoining the first surface, the first surface being insulated;
   positioning a second electrode having a second surface spaced apart from the first surface of the first electrode;
   pumping a gas through the plurality of holes wherein the gas is greater than or equal to atmospheric pressure, the gas comprising helium;
   coupling a power supply to the first electrode having a frequency of between 40 and 500 kHz;
   connecting a power supply between the first surface of the first electrode and the second surface of the second electrode wherein the polymeric support is subjected to atmospheric glow discharge and maintaining a ratio of web transport speed in ft./minute of the polymeric support to the power density in the treatment zone in watts per square centimeter of at least 1:1.

2. The method of claim 1 wherein the gas comprises helium and oxygen.

3. The method of claim 1 wherein the gas comprises helium and nitrogen.

4. The method of claim 1 wherein the gas comprises helium, oxygen and nitrogen.

5. The method according to claim 3 wherein the nitrogen content is between 1% and 4% by flow.

6. The method of claim 5 wherein the nitrogen content is 2% by flow.

7. The method of claim 2 wherein the oxygen content is between 0.1% and 8% by flow.

8. The method of claim 1 wherein the first electrode comprises aluminum.

9. The method of claim 8 wherein the first surface is insulated by modifying the aluminum.

10. The method of claim 1 wherein the polymeric support comprises a polyester.

11. The method of claim 10 wherein the polyester is polyethylene terephthalate.

12. The method of claim 10 wherein the polyester is polyethylene naphthalate.

13. The method of claim 1 wherein the polymeric support is polyethylene coated paper.

14. The method according to claim 1 further comprising; coating the polymeric support with a photographic emulsion antistatic layer, magnetic layer or lubricant layer after the polymeric support is subjected to the atmospheric glow discharge.

15. The method of claim 14 wherein the polymeric support is first treated with a layer of gelatin and then coated with the photographic emulsion.

16. The method of claim 14 wherein the support is coated with an antistatic layer.

17. The method of claim 14 wherein the support is coated with a magnetic layer.

18. The method of claim 14 wherein the support is coated with a lubricant layer.

* * * * *